| | | | |
|---|---|---|---|
| | | United States Patent [19] | [11] 3,853,588 |
| | | Haskell et al. | [45] Dec. 10, 1974 |

[54] VINYLIDENE CHLORIDE-TOPCOATED, ORTHOPHOSPHATE-COATED POLYMERIC OBJECTS

[75] Inventors: Vernon C. Haskell; James L. Hecht, both of Richmond, Va.

[73] Assignee: E. I. du Pont de Nemours and Company, Wilmington, Del.

[22] Filed: June 5, 1973

[21] Appl. No.: 367,343

Related U.S. Application Data

[63] Continuation-in-part of Ser. Nos. 273,301, July 19, 1972, Pat. No. 3,821,014, and Ser. No. 316,271, Dec. 18, 1972.

[52] U.S. Cl............. 117/46 FC, 117/47 A, 117/72, 117/76 F, 117/92, 117/138.8 F, 161/184, 161/191
[51] Int. Cl...................... C01b 25/36, B32b 27/06
[58] Field of Search..... 117/138.8 F, 138.8 R, 76 F, 117/72, 92, 169 R, 161 ZB, 46 FC, , 47 A; 161/191, 184, 231

[56] References Cited

UNITED STATES PATENTS

| | | | |
|---|---|---|---|
| 2,786,787 | 3/1957 | Florio............................. | 117/169 R |
| 2,909,451 | 10/1959 | Lawler et al..................... | 117/169 R |
| 3,072,483 | 1/1963 | Trevoy et al.................. | 117/46 FC X |
| 3,284,276 | 11/1966 | Berenbaum et al................. | 161/184 |
| 3,293,111 | 12/1966 | McCormick........................ | 161/184 |
| 3,335,029 | 8/1967 | Holben........................ | 117/138.8 F |
| 3,353,988 | 11/1967 | Wolinski........................... | 117/47 A |
| 3,375,215 | 3/1968 | Kane.................................... | 260/23 |
| 3,442,686 | 5/1969 | Jones......................... | 117/138.8 F X |
| 3,741,253 | 6/1973 | Brax et al. ...................... | 161/184 X |
| 3,785,845 | 1/1974 | Birchall et al................. | 117/76 F X |

*Primary Examiner*—Ralph Husack

[57] ABSTRACT

Organic, polymeric shaped objects such as films coated with aluminum and/or ferric orthophosphate and topcoated with a vinylidene chloride copolymer containing about 2 to 30% of a polymeric epoxy resin.

8 Claims, No Drawings

VINYLIDENE CHLORIDE-TOPCOATED, ORTHOPHOSPHATE-COATED POLYMERIC OBJECTS

CROSS REFERENCE TO RELATED APPLICATIONS

This application is a continuation-in-part of our copending application Ser. No. 273,301, filed July 19, 1972, now Pat. No. 3,821,014, and of our copending application Ser. No. 316,271, filed Dec. 18, 1972.

BACKGROUND OF THE INVENTION

This invention relates to vinylidene chloride-topcoated, orthophosphate-coated, polymeric shaped objects such as films.

In the development of films such as those for packaging uses, it is important to provide coatings which improve the barrier of the films to gases and moisture. Inorganic barrier coatings such as those from silicon oxides and from aluminum and/or ferric orthophosphates have been developed for packaging films to provide extremely low permeability to gases and moisture. In Jones, U.S. Pat. No. 3,442,686, it is disclosed that organic topcoatings such as those from vinylidene chloride polymers can play an important role in improvement in barrier properties of films coated with a glassy barrier of inorganic material and provide for bonding to other films and for heat sealing. The aluminum and ferric orthophosphate coatings, however, have not bonded as well to ordinary vinylidene chloride copolymer topcoatings as is desirable under particularly moist conditions. Because these orthophosphate coatings exhibit exceptionally high barrier properties, it is particularly desirable to provide a vinylidene chloride polymer topcoating that bonds very tightly thereto.

SUMMARY OF THE INVENTION

In an article comprising an organic polymeric shaped article having a substantially continuous gas-impermeable coating on at least one surface thereof of aluminum orthophosphate or iron orthophosphate, the improvement which consists in said coating having a topcoating of a vinylidene chloride polymer containing from about 2 to 30 weight percent of a polymeric epoxy resin.

DETAILED DESCRIPTION OF THE INVENTION

The aluminum and/or ferric orthophosphate-coated films used in this invention wherein the atom ratio of metal to phosphorus is from 2.3 to 0.5 are prepared as set forth in our applications Ser. Nos. 273,301 and 316,271, the teachings of which are all incorporated herein by reference.

It is preferred that the vinylidene chloride copolymer have at least 88% vinylidene chloride monomer units. It is also preferred that the copolymer have less than 5% of its units of copolymerized aliphatic carboxylic acid such as itaconic acid or the like. Particularly preferred are interpolymers of vinylidene chloride, acrylonitrile, methyl methacrylate and itaconic acid. Specific copolymers suitable are copolymers of 5.7% acrylonitrile, 3.6% methyl methacrylate, 0.3% itaconic, the remainder being vinylidene chloride; and 4.0% acrylonitrile, 5.3% methyl methacrylate, 0.3% itaconic acid, the remainder being vinylidene chloride.

The epoxy resin should be present in an amount ranging from about 2 to 30% of the total weight of the topcoat. It is preferred that the topcoat contain at least 7% epoxy resin and amounts within the range of 12 to 25% are particularly preferred. The epoxy resin should have a molecular weight of about 300 to 4,000 and an epoxide equivalent to carboxyl in a copolymer greater than 1 and preferably about 6 to 1. Especially suitable epoxy resins are those known as diglycidyl ethers of bisphenol A such as the Epon resins available from Shell Chemical Company, especially Epon 1001 and Epon 828.

It is preferred that the topcoat composition contain about 0.5 to 5%, preferably about 2%, of a wax, e.g., a paraffin wax or carnauba wax. Calcium stearate may also be used as a wax equivalent.

The topcoat composition may contain other ingredients. Particulate materials, either inorganic or organic, may be included to improve slip. Other additives such as antistatic agents may also be included. Agents which partially react with the epoxy resin may also be included such as mineral acids, e.g., 0.2 to 2% phosphoric acid, Lewis acids, and polymeric amines. Care should be taken not to include too much curing agent or the compositions may gel before application or cure to a degree that impairs the heat sealability.

The use of the improvement of this invention results in a composition with reduced blush, improved adhesion of the topcoat composition to the orthophosphate coating and improved barrier properties. Another important advantage is that this invention helps improve the stability of barrier properties of inorganic barrier coatings under high humidity. The vinylidene chloride topcoat layers of this invention may suitably be applied directly to the organic polymeric film surface as well as to the orthophosphate-coated surface. Accordingly, a film coated on only one side with an orthophosphate barrier coating may subsequently be coated on both surfaces with the topcoating composition of this invention. The base film should be treated with flame or electric discharge as is known in the art to enhance adhesion in order to obtain high peel strength at high humidity.

The epoxy resin appears to perform several functions. It appears to act as a blending agent, making the wax and vinylidene chloride copolymer more compatible. This improves homogeneity and, hence, transparency of the coating and also improves its barrier properties. Secondly, the epoxy function is very reactive toward amino groups which may be present in the orthophosphate coating layer to the presence of melamine formaldehyde resins therein, and any other surface containing such resins, e.g., cellophane.

The general techniques for applying the topcoating of this invention are well known to those skilled in the art and specific procedures are set forth in the examples. Films prepared according to this invention are quite useful as packaging films, particularly where low gas and moisture permeability is desired, especially at conditions of high humidity.

This invention will now be described in connection with the following examples wherein parts and percentages are by weight unless otherwise indicated.

EXAMPLE 1

A colloidal dispersion was prepared from 90.7 grams of 50% aluminum chlorhydroxide solution, commercially available as "Chlorhydrol" from Reheis Division, Armour & Co.; 54.0 grams of 86% phosphoric acid, 1,169 milliliters of methanol, and 20.0 grams of "Accobond 3524" 30% melamine formaldehyde resin. The dispersion was prepared by first combining the phosphoric acid and one-half of the methanol, adding the melamine formaldehyde resin, and combining this with a mixture of the aluminum chlorhydroxide and the other half of the methanol. The dispersion was coated onto both sides of a 0.5 mil biaxially oriented, heat-set polyethylene terephthalate film using doctor rolls.

The coated film was dried in a tower with a countercurrent air flow. The final coating weight was about 0.34 gram per square meter.

The aluminum orthophosphate coated film was then coated with a topcoating of 240 grams of copolymer of about 93.5% vinylidene chloride, 3% acrylonitrile, 3% methyl methacrylate and 0.5% itaconic acid, 60 grams of Shell Epon 1001 epoxy resin; 6 grams of paraffin wax; 2 grams of water-ground talc; 600 milliliters of toluene; and 1,100 milliliters of tetrahydrofuran. This topcoating was applied in a manner similar to the aluminum orthophosphate.

The film samples were tested for moisture and gas permeability, and the results obtained were as follows:

|  | $AlPO_4$ only | $AlPO_4$ + Topcoat |
| --- | --- | --- |
| Coating weight (g./m.$^2$) | 0.34 | 4.3 (topcoat) |
| Moisture Permeability (g./100 m.$^2$/hr.) | 40 | 4.3 |
| Oxygen Permeability (cc./100 in.$^2$/24 hr.) | 0.20 | 0.02 |

EXAMPLE 2

The general procedure of Example 1 was repeated, except that 1,189 milliliters of ethanol is used in place of the methanol and melamine formaldehyde resin, and the substrate coated was cellophane instead of biaxially oriented polyethylene terephthalate.

The film samples coated with aluminum orthophosphate as well as aluminum orthophosphate and the polymer topcoat were tested for moisture and gas permeability, and were found to exhibit the following characteristics:

|  | $AlPO_4$ only | $AlPO_4$ + Topcoat |
| --- | --- | --- |
| Coating weight (g./m.$^2$) | 0.53 | 3.8 (topcoat) |
| Moisture Permeability (g./100 m.$^2$/hr.) | 620 | 13.3 |
| Oxygen Permeability (cc./100 in.$^2$/24 hr.) | 0.07 | 0.02 |

Uncoated cellophane generally has a moisture permeability of several thousand and an oxygen permeability, for normal moisture content, of about from 1–5.

EXAMPLE 3

The procedure of Example 1 is repeated, except that 1,169 milliliters of water are substituted for the methanol in the aluminum phosphate dispersion, and 2 grams of 86% phosphoric acid is added to the topcoating formulation.

The resulting film samples, having aluminum orthophosphate as well as aluminum orthophosphate with a polymer topcoat, are evaluated for moisture and oxygen permeability and found to exhibit the following characteristics:

|  | $AlPO_4$ | $AlPO_4$ + Topcoat |
| --- | --- | --- |
| Coating weight (g./m.$^2$) | 0.33 | 1.9 (topcoat) |
| Moisture Permeability | 18 | 8.7 |
| Oxygen Permeability (cc./100 in.$^2$/24 hr.) | 0.30 | 0.09 |

Example 4

A 50-gauge polyethylene terephthalate film flame treated on both sides to improve adhesion is coated on both sides with aluminum orthophosphate to a total dry coating weight of 0.2 grams/square meters. No "Accobond" was present.

The coated film is then primed with a bath of 1% diamino silane (A-1120, available from Union Carbide Corp.) with doctor rolls set at 2 mils. The temperature is 135°C. and the rate is about 50 feet/minute (fpm).

The primed film is topcoated at 50 fpm in a coating tower with 150°C. air inlet temperature followed by postheating the film in an air oven at 150°C. for 5 seconds. The topcating bath is as follows:

| $VCl_2$ copolymer* | 240 | grams |
| --- | --- | --- |
| Epon 1001 epoxy resin | 60 | do. |
| Flat hydrite D kaolin | 2 | do. |
| Sunoco 4412 wax | 2.8 | do. |
| Toluene | 550 | do. |
| Tetrahydrofuran | 1190 | do. |

*A copolymer of 90.5% vinylidene chloride, 4.0% acrylonitrile, 5.3% methyl methacrylate, 0.3% itaconic acid.

The properties of the resulting film are as follows:

| Oxygen Permeability (cc./100 in.$^2$/hrs./atm.) | <0.02 |
| --- | --- |
| Moisture Permeability (g./100 m.$^2$/hr.) | 7 |
| Heat seals at 100°F. and 80% relative humidity | 410 g./inch |
| Heat seals at 100°F. and 90% relative humidity | 340 g./inch |

EXAMPLE 5

The general procedure according to the invention was repeated using methanol as the solvent for the ferric orthophosphate coating instead of water. The formulation of the ferric orthophosphate coating bath was 26.5 grams of $FeCl_3 \cdot 6H_2O$, 15.0 grams of 86% phosphoric acid, 7.5 grams of "Accobond 3524" melamine formaldehyde resin, and 951 milliliters of methanol. Two hundred grams of "Rexyn 201" ion exchange resin was used to remove excess HCl. The resin, having an exchange capacity of 4.4 meg./g. dry resin and 61% moisture was stirred with the mixture and then removed. The iron to phosphorus ratio was about 0.75. The dispersion was applied with a doctor roll solvent coater onto both sides of a 0.5 mil, biaxially oriented, untreated polyethylene terephthalate film and dried with hot air.

The ferric orthophosphate coated film was then coated on both sides with a topcoating of 240 grams of a copolymer of about 93.5% vinylidene chloride, 3% acrylonitrile, 3% methyl methacrylate and 0.5% itaconic acid; 60 grams of Shell Epon 1001 epoxy resin; 6 grams of paraffin wax; 2 grams of waterground talc; 600 milliliters of toluene; and 1,100 milliliters of tetrahydrofuran. This topcoating was applied in a manner similar to the ferric orthophosphate.

The film samples were tested for moisture and gas permeability, and the results obtained were as follows:

|  | FePO$_4$ only | FePO$_4$ + Topcoat |
|---|---|---|
| Total coating weight (g./m.$^2$) | 0.33 | 4.8 (topcoat) |
| Moisture Permeability (g./100 m.$^2$/hr.) | 128 | 21.9 |
| Oxygen Permeability (cc./100 in.$^2$/24 hr.) | 0.054 | 0.02 |

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

We claim:

1. In an article comprising an organic, polymeric shaped article having a substantially continuous gas-impermeable coating on at least one surface thereof of aluminum orthophosphate or iron orthophosphate, wherein the atom ratio of metal to phosphorus is from 2.3 to 0.5 the improvement which consists in said coating having a topcoating of a vinylidene chloride polymer containing from about 2 to 30 weight percent of a polymeric epoxy resin.

2. An article as defined in claim 1 wherein the orthophosphate is aluminum orthophosphate.

3. An article as defined in claim 1 wherein the orthophosphate is iron orthophosphate.

4. An article as defined in claim 1 wherein the vinylidene chloride polymer is a copolymer of at least 88% vinylidene chloride units and less than 5% copolymerized aliphatic carboxylic acid units.

5. An article as defined in claim 4 wherein said topcoat contains about 0.5 to 5% of a wax.

6. An article as defined in claim 5 wherein said epoxy resin percentage is from about 12 to 25 weight percent.

7. An article as defined in claim 5 wherein the orthophosphate coating contains a melamine formaldehyde resin.

8. An article as defined in claim 5 wherein said surface is first conditioned to promote adhesion by electric discharge or flame treatment.

* * * * *